United States Patent Office 3,073,848
Patented Jan. 15, 1963

3,073,848
TETRAHYDROFURFURYL CARBAMATES
Burton Kendall Wasson, 103 Broadview Ave., Valois, Quebec, Canada, and John Mulvin Parker, 43 Strathearn Ave., Montreal, Quebec, Canada
No Drawing. Filed Mar. 19, 1959, Ser. No. 800,375
Claims priority, application Great Britain Oct. 14, 1958
8 Claims. (Cl. 260—347.4)

The present invention relates to a new series of therapeutically valuable carbamates and to a process for their preparation.

The novel carbamates of the present invention are the substituted tetrahydrofuran-4-methyl carbamates represented by the following general formula:

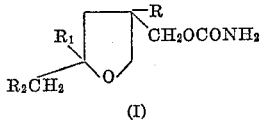

(I)

wherein R is a member selected from the group consisting of an alkyl radical having from 1 to 6 carbon atoms, an alkenyl radical having from 2 to 6 carbon atoms, an alkynyl radical having from 2 to 6 carbon atoms and a phenyl radical, and $R_1$ and $R_2$ are members selected from the group consisting of hydrogen and a lower alkyl radical having from 1 to 6 carbon atoms.

The new substituted tetrahydrofuran-4-methyl carbamates (I) of the present invention may be prepared by reducing a diethyl α,α-disubstituted malonate (II) of the formula:

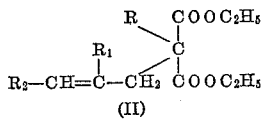

(II)

wherein R, $R_1$ and $R_2$ are as defined above, followed by ring closure of the diol, forming the chlorocarbonate by the use of phosgene, and finally treating with either anhydrous ammonia or ammonium hydroxide. The intermediates thus obtained need not be isolated or purified unless analytical specimens are desired. When prepared by the aforesaid process, the products of the invention are normally isolated either as white crystalline solids or viscous liquids.

The reduction of a malonate having the general Formula III wherein $R_3$ and $R_4$ are hydrogen, alkyl, or branched alkyl groups, with lithium aluminum hydride affords a substituted 1,3-propanediol (IV), and successive treatment of the diol with phosgene and ammonia normally gives the corresponding dicarbamate (V) which is illustrated as follows:

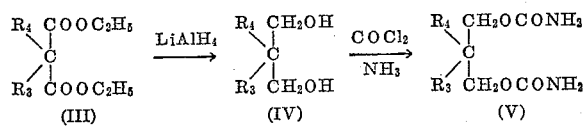

It has now been discovered that when the diethyl malonate corresponding to Formula II is used as starting material, the diol (VI) obtained from the lithium aluminum hydride reduction of the starting malonate (II) is cyclized by subsequent treatment with mineral acid to form the novel substituted tetrahydrofuran-4-methanol (VII) shown as follows:

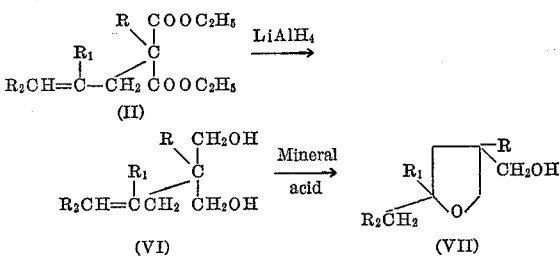

The substituted tetrahydrofuran-4-methanol (VII) may then be converted to the corresponding novel carbamates (I) of the present invention by formation of the chlorocarbonate by the use of phosgene, and finally treatment with either anhydrous ammonia or ammonium hydroxide.

More specifically, the monocarbamates of the present invention may be obtained as follows: The process involves the reduction of the disubstituted malonate (II) with lithium aluminum hydride in the presence of a solvent in such a manner that the dropwise addition of the malonate to the reducing agent is accompanied by efficient stirring and adequate cooling. The addition time may vary greatly without an appreciable change in the yield. The reduction mixture may be immediately decomposed by the slow addition of ice accompanied by good external cooling or it may be left for a period as long as 24 hours. The reduction may be carried out at a temperature in the range of 0 C.–5° C., but it is found that good yields of the 2,2-disubstituted-1,3-propanediol (VI) are obtained at temperatures ranging from −10° C. to the reflux temperature of the reaction mixture. The reduction is carried out using 1.5 to 2 moles of lithium aluminum hydride per mole of the malonate. The volume of diluent is not critical and may vary over wide limits without greatly affecting the product but it is advisable to use sufficient solvent for facile solution of the lithium aluminum hydride and to facilitate adequate stirring and smooth reaction. As an example of suitable solvents there may be mentioned diethyl ether, higher molecular weight ethers or tetrahydrofuran. The decomposition of the excess lithium aluminum hydride and the metallo-organic complex is effected by the addition of ice or may also be accomplished by the use of moist ether, ethyl acetate or methanol. Repeated trituration of the semi-solids with ethyl ether is quite adequate for the isolation of the diol. The bulk of the solids may be dissolved by acidification, and a two-phase extraction with ethyl ether carried out. The latter procedure usually leads to lower yields of the diol. Other methods of reduction may be employed, for example sodium and alcohol.

The 2,2-disubstituted-1,3-propanediols (VI) are cyclized to the corresponding 2,2,4-trisubstituted tetrahydrofuran-4-methanol or 2,4-disubstituted tetrahydrofuran-4-methanol (VII) by treatment with mineral acid for example, hydrochloric or sulfuric acids. This cyclization may be accomplished by refluxing a tetrahydrofuran solution of the diol several hours with a small amount of concentrated mineral acid, for example hydrochloric acid. Alternatively, careful addition of a small amount of concentrated hydrochloric acid to the 2,2-disubstituted-1,3-propanediol (VI) and maintenance of the reaction tempertaure below 100° C. affords high yields of the cyclized product. On the other hand if an excessive amount of mineral acid is used, reaction temperature rises rapidly above 100° C. with subsequent decreased yield of cyclized product (VII). Furthermore, if during the decomposition of the lithium aluminum hydride complex, hydrochloric acid is used and then is not completely removed, the crude diol (VI) is partially transformed during distillation in the presence of a small amount of residual hydrochloric acid to the corresponding tetrahydrofuran-4-methanol (VII). Propanediols of Formula VI wherein $R_1$ stands for methyl and $R_2$ for hydrogen are especially susceptible to ring closure and require very mild conditions to effect high yields. On the other hand when $R_1$ and $R_2$ stand for hydrogen a much more vigorous treatment is required to effect cyclization.

The preparation of the 2,2,4-trisubstituted tetrahydrofuran-4-methyl carbamate or 2,4-disubtituted tetrahydrofuran-4-methyl carbamate (I) is readily achieved by the addition of a tetrahydrofuran solution of the carbinol (VII) to a concentrated tetrahydrofuran solution of phosgene maintained at —10° to —5° C. The temperature range of this addition may be wider than this but the above range is suitable both for the collection of the phosgene and for the formation of the intermediate monochlorocarbonate. The addition time of 2.5 hours is quite satisfactory but this also may vary from at least 1 to 5 hours. The addition of the chlorocarbonate solution to concentrated ammonium hydroxide then leads to the formation of the carbamate (I). The tetrahydrofuran is distilled, the aqueous residue extracted with diethyl ether and the ether distilled to give the crude carbamate (I) which may be crystallized from a suitable solvent. The temperature of this reaction is kept between —10° to 15° C. but this may vary over wider limits and still give the desired product. An alternative method comprises the passing of gaseous ammonia into the chlorocarbonate solution with adequate cooling, the tetrahydrofuran is removed, followed by ether extraction, distillation of the ether, high vacuum distillation of the product, and crystallization from acetone and petroleum ether. The chlorocarbonate may also be prepared in solvent media other than tetrahydrofuran, for example, toluene and using a hydrogen chloride acceptor such as antipyrine. Other solvents such as hot water, methanol-water, ethanol-water, ether-petroleum ether may be used for the recrystallization of the carbamate.

A further alternative method for the preparation of the carbamate (I) from the carbinol (VII) is by ester exchange with ethyl carbamate using a suitable catalyst such as aluminum isopropylate to promote the reaction while simultaneously removing the liberated ethanol.

It is also within the scope of the present invention to provide N-monosubstituted (VIII) or N,N-disubstituted (IX) carbamates of the general formula:

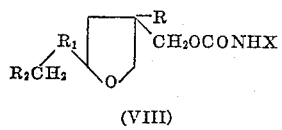

(VIII)

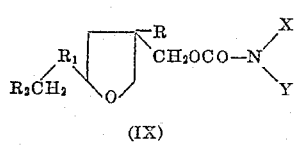

(IX)

wherein X stands for a radical selected from the group consisting of a straight and branched chain alkyl or alkylene radical having from 1 to 6 carbon atoms and Y stands for hydrogen, or a straight or branched chain alkyl or alkylene radical having from 1 to 6 carbon atoms.

The N-substituted carbamates may be obtained by various processes. For example, the carbinol (VII) may be treated with phosgene to form the chlorocarbamate (X) which is then treated with an amine of the formula $NH_2X$ or NHXY as follows:

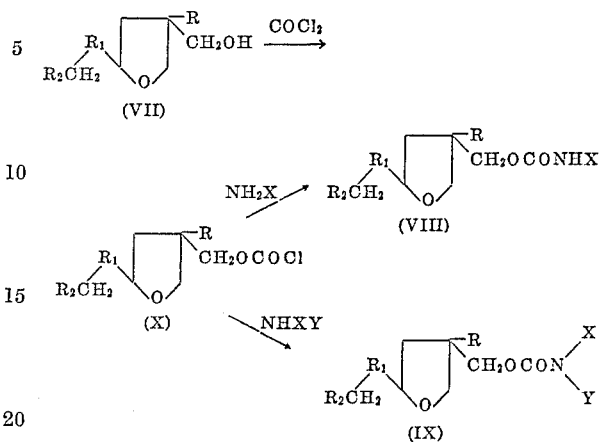

Alternatively the carbinol (VII) may be reacted with an isocyanate of the formula XCNO as follows:

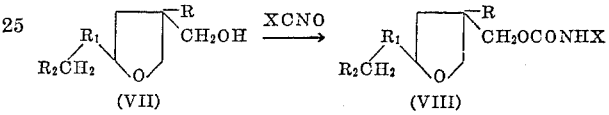

The new carbamates covered by the present invention have been found to produce ataxic and paralyzing effects on intraperitoneal injection or oral administration in mice. The pharmacological activities of some of the compounds of the present invention are shown in Table I, wherein dosages are expressed in mg. per kg. of body weight.

TABLE I

| R | $R_1$ | $R_2$ | LD/50 Mice, Intraperitoneally | LD/50 Mice, Orally | Paralyzing dose Mice, Intraperitoneally | Oral |
|---|---|---|---|---|---|---|
| $C_3H_5$ | $CH_3$ | H | 585 | 660 | 300 | 450 |
| $CH_3$ | $CH_3$ | H | 840 | 2,280 | 560 | --- |
| $C_2H_5$ | $CH_3$ | H | 720 | 1,400 | 260 | 470 |
| $C_3H_7$ | $CH_3$ | H | 600 | 2,200 | 230 | --- |
| $C_3H_5$ | $CH_3$ | H | 420 | -------- | 188 | --- |
| $C_6H_5$ | $CH_3$ | H | 1,140 | -------- | 770 | --- |

When the 2,2-dimethyl-4-allyltetrahydrofuran-4-methyl carbamate is administered orally to monkeys, dogs, cats and man, it has been found that loss of aggressiveness and fear is obtained at a substantially low dosage. It was found that this compound and the 2,2,4-trimethyltetrahydrofuran-4-methyl carbamate, when administered to mice, exhibited marked anticonvulsant properties against electroshock convulsions.

Monkeys showed greater taming effects with 2,2-dimethyl-4-allyltetrahydrofuran-4-methyl carbamate at an oral dosage of 100 mg./kg. than at a 200 mg./kg. dose of 2-methyl-2-n-propyl-1,3-propanediol dicarbamate, which is today a useful drug for evaluating taming effects. Similarly, in the dog, sedation with 2,2-dimethyl-4-allyltetrahydrofuran-4-methyl carbamate was produced at 50 mg./kg. while in the cat, a dosage of 100 mg./kg. produced sedation, taming and muscular weakness. Further in clinical trials, this compound at oral doses of 200 mg. four times a day reduced anxiety and temper tantrums in patients to a greater extent than when perphenazine, a potent phenothiazine, was used and was found to be free from undesirable side effects.

The novel carbamates of the present invention are primarily intended for oral use, and may thus be administered in the form of tablets, pills or capsules. They may also be dissolved in a suitable solvent for administration in a liquid form either orally or by injection.

EXAMPLES

The present invention will be more fully understood by referring to the following examples which are given to illustrate rather than limit the scope of the invention.

*Example I.—2,2-Dimethyl-4-Allyltetrahydrofuran-4-Methyl Carbamate*

2,2-DIMETHYL-4-ALLYLTETRAHYDROFURAN-4-METHANOL

Diethyl allyl(2 - methyl-2-propenyl)malonate (110.2 grams, B.$_{10}$ 118–128° C.) dissolved in 200 ml. anhydrous ethyl ether was added dropwise during three and one-half hours to 33.0 grams of lithium aluminum hydride in 450 ml. of anhydrous ethyl ether accompanied by stirring.

The temperature was maintained at —10° to —5° C. The mixture was stirred at this temperature for one hour, then left at room temperature overnight. The mixture was cooled with an ice-salt bath and the excess lithium aluminum hydride and the metallo-organic complex decomposed by the addition of ice and water. The mixture was treated with sufficient 6 N hydrochloric acid to achieve slight acidity. The mixture was saturated with sodium chloride and extracted repeatedly with ethyl ether. The combined ethyl ether extracts were washed to neutrality with water and the ether removed to give a yellow liquid. This liquid was refluxed two hours with 2 ml. concentrated hydrochloric acid in 50 ml. tetrahydrofuran and vacuum distillation gave 57.6 grams of 2,2-dimethyl-4-allyltetrahydrofuran-4-methanol as a colorless liquid, B.$_{0.05-0.07}$ 66–72° C.

*Analysis.*—Calculated for $C_{10}H_{18}O_2$: C, 70.55%; H, 10.66%. Found: C, 70.17%; H, 10.45%. Molecular weight (Rast) calculated: 170. Found: 175.

2,2-DIMETHYL-4-ALLYLTETRAHYDROFURAN-4-METHYL CARBAMATE

Phosgene (39.6 grams) was collected at —10° to 0° C. in 40 ml. tetrahydrofuran and treated dropwise with efficient stirring during one hour at —10° to —5° C. with a solution of 34.0 grams 2,2-dimethyl-4-allyltetrahydrofuran-4-methanol dissolved in 45 ml. tetrahydrofuran. The mixture was stirred an additional hour. The mixture was added during 2.5 hours to 150 ml. concentrated ammonium hydroxide and 3.6 grams of sodium bisulfite at —10° to 15° C. The mixture was stirred vigorously for a further 0.75 hour. The solids were dissolved by the addition of water, the tetrahydrofuran removed in vacuo and cooling of the aqueous residue yielded a liquid which crystallized on standing overnight in the refrigerator to give 20.9 grams of 2,2-dimethyl-4-allyltetrahydrofuran-4-methyl carbamate as prisms, melting point 47–52° C. Recrystallization of the crude product from methanol and water raised the melting point to 56–58° C.

*Analysis.*—Calculated for $C_{11}H_{19}NO_3$: C, 61.95%; H, 8.98%; N, 6.56%. Found: C, 62.01%; H, 8.85%; N, 6.68%, 6.66%. Molecular weight (Rast) calculated: 213. Found: 211, 216.

By proceeding in the same manner and starting with the following malonates:

diethyl vinyl(2-methyl-2-propenyl)malonate,
diethyl (1-propenyl)(2-methyl-2-propenyl)malonate,
diethyl isopropenyl (2-methyl-2-propenyl)malonate,
diethyl (1-butenyl)(2-methyl-2-propenyl)malonate,
diethyl (2-butenyl)(2-methyl-2-propenyl)malonate,
diethyl (3-butenyl)(2-methyl-2-propenyl)malonate,
diethyl (1-methyl-2-propenyl)(2-methyl-2-propenyl) malonate,
diethyl (2-methyl-2-propenyl)(2-methyl-2-propenyl) malonate,
diethyl (1-methyl-1-propenyl)(2-methyl-2-propenyl) malonate,
diethyl (2-methyl-1-propenyl)(2-methyl-2-propenyl) malonate,
diethyl(1-pentenyl)(2-methyl-2-propenyl)malonate,
diethyl (2-pentenyl)(2-methyl-2-propenyl)malonate,
diethyl(3-pentenyl)(2-methyl-2-propenyl)malonate,
diethyl(4-pentenyl)(2-methyl-2-propenyl)malonate, and
diethyl (2-ethyl-2-propenyl)(2-methyl-2-propenyl) malonate, there will be obtained the following:

2,2-dimethyl-4-vinyltetrahydrofuran-4-methyl carbamate,
2,2-dimethyl-4-(1-propenyl)tetrahydrofuran-4-methyl carbamate,
2,2-dimethyl-4-isopropenyltetrahydrofuran-4-methyl carbamate,
2,2-dimethyl-4-(1-butenyl)tetrahydrofuran-4-methyl carbamate,
2,2-dimethyl-4-(2-butenyl)tetrahydrofuran-4-methyl carbamate,
2,2-dimethyl-4-(3-butenyl)tetrahydrofuran-4-methyl carbamate,
2,2-dimethyl-4-(1-methyl-2-propenyl)tetrahydrofuran-4-methyl carbamate,
2,2-dimethyl-4-(2-methyl-2-propenyl)tetrahydrofuran-4-methyl carbamate,
2,2-dimethyl-4-(1-methyl-1-propenyl)tetrahydrofuran-4-methyl carbamate,
2,2-dimethyl-4-(2-methyl-1-propenyl)tetrahydrofuran-4-methyl carbamate,
2,2-dimethyl-4-(1-pentenyl)tetrahydrofuran-4-methyl carbamate,
2,2-dimethyl-4-(2-pentenyl)tetrahydrofuran-4-methyl carbamate,
2,2-dimethyl-4-(3-pentenyl)tetrahydrofuran-4-methyl carbamate,
2,2-dimethyl-4-(4-pentenyl)tetrahydrofuran-4-methyl carbamate, and
2,2-dimethyl-4-(2-ethyl-2-propenyl)tetrahydrofuran-4-methyl carbamate.

*Example II.—2,2-Dimethyl-4-Allyltetrahydrofuran-4-Methyl Carbamate*

Diethyl allyl(2 - methyl - 2-propenyl)malonate (332 grams) in 600 ml. of anhydrous ethyl ether was added dropwise during 5 hours at 0° C. to 99.5 grams of lithium aluminum hydride dissolved in 1350 ml. anhydrous ethyl ether accompanied by stirring. The mixture was stirred one hour at 0° C., then left overnight at room temperature. It was cooled to 0° C. and ice added carefully, followed by the addition of 500 ml. 2 N hydrochloric acid. The slurry was repeatedly extracted with ether, the ether extracts were combined, washed with a small amount of water, and distilled. Vacuum distillation of the residue gave 175.3 grams of carbinol fraction as a colourless oil, B.$_{0.05}$ 60–86° C.

Phosgene (138.6 grams) was collected at —10° to —5° C. in 140 ml. tetrahydrofuran and treated dropwise under efficient stirring at —5° to 5° C. with 119.0 grams of the preceding carbinol dissolved in 158 mls. of tetrahydrofuran. The mixture was stirred for one hour at this temperature and left overnight at room temperature. The mixture was added dropwise during six hours to a large excess of concentrated ammonium hydroxide maintained at —5° to —10° C. The tetrahydrofuran was distilled off on a water bath at a temperature below 70° C. Water was added and the mixture was extracted with ether, the combined ether extracts were dissolved in methanol and water and refrigerated to give 26.5 grams of crystalline material, melting at 75–105° C. Further crystallization of this material gave 27.7 grams of 2-allyl-2-methallyl-1,3-propanediol dicarbamate, M.P. 118–120° C. The combined mother liquors afforded a product which on further purification gave 24.7 grams of 2,2-dimethyl-4-allyltetrahydrofuran-4-methyl carbamate, M.P. 51–56° C. Further recrystallization raised the melting point to 54–56° C.

*Example III.—2,2,4-Trimethyltetrahydrofuran-4-Methyl Carbamate*

2,2,4-TRIMETHYLTETRAHYDROFURAN-4-METHANOL

Diethyl methyl (2-methyl-2-propenyl)malonate (92.4 grams) dissolved in 250 ml. anhydrous ethyl ether was added dropwise during three hours to 31 grams of lithium aluminum hydride dissolved in 800 ml. anhydrous ether under nitrogen and accompanied by magnetic stirring. The temperature was maintained at 0° C. The mixture was stirred one hour and left at room temperature for 48 hours. The mixture was cooled with an ice-salt bath and the excess lithium aluminum hydride and complex decomposed by the addition of ice and subsequent addition of 300 ml. 6 N hydrochloric acid. An extra 125 ml. of ethyl ether was added. The gummy mixture was treated with solid sodium chloride and extracted five times with ethyl ether. The ether extracts were combined, washed with water, and the ethyl ether distilled to give 44 grams of yellow liquid. This liquid was refluxed two hours with 1 ml. concentrated hydrochloric acid and 40 ml. tetrahydrofuran. The acid and tetrahydrofuran were distilled off and the crude product distilled in vacuo to yield 41.9 grams (72% of the theoretical yield) of 2,2,4-trimethyltetrahydrofuran-4-methanol as an oil $B_{.15}$ 92–105° C.

2,2,4-TRIMETHYLTETRAHYDROFURAN-4-METHYL CARBAMATE

Phosgene (50.2 grams) was collected at −10° to 0° C. in 23.1 ml. tetrahydrofuran and treated dropwise with stirring during 1.5 hours, at 0° C. with 41.1 grams of the above reduction product dissolved in 43 ml. of tetrahydrofuran. The mixture was stirred two hours with the temperature rising to 15° C. This mixture was added slowly to a mixture of 138 ml. concentrated ammonium hydroxide and 4 grams sodium bisulfite at 0–19° C. The solids were dissolved by the addition of water and the tetrahydrofuran distilled off on the steam bath. The residue was extracted with ethyl ether, the ether extracts were washed with water, dried, and the ether distilled to give 50.1 grams of a viscous liquid which crystallized on long standing. This solid was distilled in vacuo to give 44.9 grams of a viscous oil which slowly crystallized, $B_{.0.09}$ 115–120° C. 2,2,4 - trimethyltetrahydrofuran-4-methyl carbamate, when recrystallized from acetone-petroleum ether, had a melting point of 46.5–47.5° C.

*Analysis.*—Calculated for $C_9H_{17}O_3N$: C, 57.73%; H, 9.15%. Found: C, 57.69%, 57.88%; H, 8.99%, 9.17%. Molecular weight (Rast) calculated: 187. Found: 185, 189.

By proceeding in the same manner and starting with the following malonates:

diethyl isopropyl(2-methyl-2-propenyl)malonate,
diethyl butyl(2-methyl-2-propenyl)malonate,
diethyl isobutyl(2-methyl-2-propenyl)malonate,
diethyl secondarybutyl(2-methyl-2-propenyl)malonate,
diethyl tertiarybutyl(2-methyl-2-propenyl)malonate,
diethyl pentyl(2-methyl-2-propenyl)malonate,
diethyl isopentyl(2-methyl-2-propenyl)malonate,
diethyl secondarypentyl(2-methyl-2-propenyl)malonate,
diethyl hexyl(2-methyl-2-propenyl)malonate,
diethyl methyl(2-ethyl-2-propenyl)malonate,
diethyl allyl(2-ethyl-2-propenyl)malonate, and
diethyl propargyl(2-ethyl-2-propenyl)malonate, there will be obtained the following:

2,2-dimethyl-4-isopropyltetrahydrofuran-4-methyl carbamate,
2,2-dimethyl-4-butyltetrahydrofuran-4-methyl carbamate,
2,2-dimethyl-4-isobutyltetrahydrofuran-4-methyl carbamate,
2,2-dimethyl-4-secondarybutyltetrahydrofuran-4-methyl carbamate,
2,2-dimethyl-4-tertiarybutyltetrahydrofuran-4-methyl carbamate,
2,2-dimethyl-4-pentyltetrahydrofuran-4-methyl carbamate,
2,2-dimethyl-4-isopentyltetrahydrofuran-4-methyl carbamate,
2,2-dimethyl-4-secondarypentyltetrahydrofuran-4-methyl carbamate,
2,2-dimethyl-4-hexyltetrahydrofuran-4-methyl carbamate,
2-methyl-2-ethyl-4-methyltetrahydrofuran-4-methyl carbamate,
2-methyl-2-ethyl-4-allyltetrahydrofuran-4-methyl carbamate, and
2-methyl-2-ethyl-4-propargyltetrahydrofuran-4-methyl carbamate.

*Example IV.—2,2-Dimethyl-4-Propyltetrahydrofuran-4-Methyl Carbamate*

Diethyl propyl(2-methyl-2-propenyl)malonate (102.4 grams, $B_{.20}$ 140–145° C.) was dissolved in 100 ml. of anhydrous ethyl ether and was added slowly to 30.4 grams of lithium aluminum hydride during two to three hours at 10–20° C. accompanied by stirring. The mixture was stirred for one hour in the cooling bath and then left overnight at room temperature. The mixture was decomposed with ice and 6 N hydrochloric acid and the product isolated by the method described in Example I. The crude 2-propyl-2(2-methyl-2-propenyl)-1,3-propanediol was refluxed two hours with 2 ml. concentrated hydrochloric acid in 80 ml. tetrahydrofuran and concentration of the liquid followed by distillation in vacuo to give 58.6 grams of 2,2-dimethyl-4-propyltetrahydrofuran-4-methanol, having a boiling point of $B_{.0.05}$ 74–94° C.

2,2-dimethyl-4-propyltetrahydrofuran-4-methanol (27.1 grams) was dissolved in 50 ml. of tetrahydrofuran and added dropwise accompanied by stirring to 31.2 grams of phosgene, dissolved in 50 ml. of tetrahydrofuran with the temperature being maintained at −10° to 0° C. The mixture was left one hour at room temperature and then was added at 0° to 10° C. to a large excess of concentrated ammonium hydroxide. The mixture was stirred for 0.5 hour, about 100 ml. of water added, and the tetrahydrofuran distilled off. The remaining mixture was extracted with ether and the ether distilled off. The residue was distilled to give 14.7 grams of distillate $B_{.0.07-0.12}$ 105–140° C. This product is 2,2-dimethyl-4-propyltetrahydrofuran-4-methyl carbamate.

The residue remaining in the distillation flask after removal of the monocarbamate became crystalline upon cooling. Recrystallization of this material from methanol gave 2-propyl-2-(2-methyl-2-propenyl) - 1,3 - propanediol dicarbamate, having a melting point of 143° to 146° C. Further recrystallization from methanol and water raised the melting point of the product to 147° to 148° C.

*Analysis.*—Calculated for $C_{12}H_{22}N_2O_4$: C, 55.78%; H, 8.58%. Found: C, 55.71%, 55.89%; H, 8.43%, 8.64%.

*Example V.—2,2-Dimethyl-4-Propyltetrahydrofuran-4-Methyl Carbamate*

2,2 - dimethyl - 4 - allyltetrahydrofuran - 4 - methanol (23.5256 grams) was reduced with 473.3 mg. of platinum oxide and hydrogen in 300 ml. ethanol. There was an uptake of 1.1 moles of hydrogen during five minutes. The catalyst was removed and the ethanol was distilled to give 23.6 grams of residual liquid. Vacuum distillation gave 20.6 grams of the reduced carbinol, 2,2-dimethyl-4-propyltetrahydrofuran-4-methanol, $B_{.0.06-0.07}$ 50–65° C., identical with the carbinol obtained in Example IV.

The above carbinol (8.8 grams) dissolved in 26 mls. of tetrahydrofuran was added dropwise to 10.25 grams of phosgene dissolved in 30 ml. of tetrahydrofuran accompanied by stirring with the temperature being maintained at −7° to 7° C. The mixture was left one hour in the ice bath and then at room temperature overnight. The product was isolated by the method described in Example I to give 6.75 grams of 2,2-dimethyl-4-propyltetrahydrofuran-4-methyl carbamate, B.$_{0.03-0.05}$ 100–15° C.

*Example VI.—2,2-Dimethyl-4-Propargyltetrahydrofuran-4-Methyl Carbamate*

Diethyl propargyl(2-methyl-2-propenyl)malonate (73.3 grams) in 200 ml. ethyl ether was added slowly to 22.1 grams of lithium aluminum hydride in 400 ml. ethyl ether at —5° to 5° C. The mixture was stirred three hours at this temperature, and left overnight at room temperature. The mixture was decomposed by the addition of ice and water. Dilute hydrochloric acid (1:1) was added to give slight acidity to the mixture. The product was then isolated by the method described in Example I to give 41.4 grams crude 2-propargyl-2-methallyl-1,3-propanediol, B.$_{0.07-0.08}$ 50–97° C. The crude diol (15.6 grams) was refluxed 1.5 hours in 45 ml. tetrahydrofuran containing 0.5 ml. concentrated hydrochloric acid to give 12.6 grams 2,2-dimethyl-4-propargyltetrahydrofuran-4-methanol having a boiling point of B.$_{10-15}$ 92–124° C. The 2,2-dimethyl-4-propargyltetrahydrofuran-4-methanol (12.6 grams) was treated with phosgene and ammonium hydroxide as described in Example I to give 2,2-dimethyl-4-propargyltetrahydrofuran-4-methyl carbamate, B.$_{0.2-0.4}$ 96–122° C.

By proceeding in the same manner and starting with the following malonates:

diethyl ethynyl(2-methyl-2-propenyl)malonate,
diethyl (1-propargyl)(2-methyl-2-propenyl)malonate,
diethyl (1-butynyl)(2-methyl-2-propenyl)malonate,
diethyl (2-butynyl)(2-methyl-2-propenyl) malonate,
diethyl (3-butynyl)(2-methyl-2-propenyl)malonate,
diethyl (4-pentynyl)(2-methyl-2-propenyl)malonate, there will be obtained the following:

2,2-dimethyl-4-ethynyltetrahydrofuran-4-methyl carbamate,
2,2-dimethyl-4-(1-propargyl)tetrahydrofuran-4-methyl carbamate,
2,2-dimethyl-4-(1-butynyl)tetrahydrofuran-4-methyl carbamate,
2-2-dimethyl-4-(2-butynyl)tetrahydrofuran-4-methyl carbamate,
2,2-dimethyl-4-(3-butynyl)tetrahydrofuran-4-methyl carbamate, and
2,2-dimethyl-4-(4-pentynyl)tetrahydrofuran-4-methyl carbamate.

*Example VII.—2,2-Dimethyl-4-Ethyltetrahydrofuran-4-Methyl Carbamate*

Diethyl ethyl(2-methyl-2-propenyl)malonate (254.7 grams) was reduced with lithium aluminum hydride as described in Example VI to give 124.6 grams of 2-ethyl-2-(2-methyl-2-propenyl)-1,3-propanediol, B.$_{15-20}$ 140–147° C. (about 95% distilling at 146–147° C.). The diol was refluxed two hours with hydrochloric acid in tetrahydrofuran to give 119.4 grams (96.4%) 2,2-dimethyl-4-ethyltetrahydrofuran-4-methanol, B.$_{15-20}$ 118–124° C. Finally 53 grams of 2,2-dimethyl-4-ethyltetrahydrofuran-4-methanol was successively treated with phosgene and ammonium hydroxide as in Example I to give 59.1 grams crude 2,2-dimethyl-4-ethyltetrahydrofuran-4-methyl carbamate. Recrystallization from methanol and water gave a melting point of 53.5–55.0° C.

*Example VIII.—2,2-Dimethyl-4-Phenyltetrahydrofuran-4-Methyl Carbamate*

Diethyl phenyl(2-methyl-2-propenyl)malonate (69.1 grams) in 138 ml. ethyl ether was added during 2.5 hours at —5° to 10° C. to 14.1 grams lithium aluminum hydride in 365 ml. dry ethyl ether. The mixture was stirred two hours at room temperature and left overnight at room temperature. The mixture was treated with methanol, methanol and water, and finally with water. The solids were collected and washed repeatedly with ethyl ether. The combined ether filtrates were washed with water, dried, and the solvent removed to give 45.5 grams of crude 2-(2-methyl-2-propenyl)-2-phenyl-1,3-propanediol. This crude diol was refluxed two hours with 40 ml. tetrahydrofuran and 1 ml. concentrated hydrochloric acid to give a crude yield of 45.3 grams 2,2-dimethyl-4-phenyltetrahydrofuran-4-methanol. Distillation gave a fraction B.$_{0.02-0.2}$ 90–140° C. (chiefly at 120° C.). 2,2-dimethyl-4-phenyltetrahydrofuran-4-methanol (19.4 grams) was dissolved in 26 ml. tetrahydrofuran and added dropwise at —10° to 2° C. to 13.98 grams phosgene dissolved in 50 ml. tetrahydrofuran. The solution was stirred 0.5 hour in the ice bath, and left several hours at room temperature. This solution was added dropwise to 90 ml. concentrated ammonium hydroxide and 0.5 gram sodium bisulfite. The reaction temperature was maintained at 0° to 20° C. The tetrahydrofuran was distilled and the remaining material was extracted with ethyl ether. The ether was washed with water and distilled to give 18.6 grams of crude 2,2-dimethyl-4-phenyltetrahydrofuran-4-methyl carbamate. Recrystallization from methanol and water gave a melting point of 81–84°C. A small amount of 2-phenyl-2-(2-methyl-2-propenyl)-1,3-propanediol dicarbamate was also isolated having a melting point of 155–157° C.

We claim:

1. The substituted tetrahydrofuran-4-methyl carbamate of the formula:

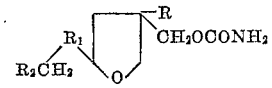

wherein R is a radical selected from the group consisting of alkyl having from 1 to 6 carbon atoms, alkenyl having from 2 to 6 carbon atoms, alkynyl having from 2 to 6 carbon atoms, and phenyl, and $R_1$ and $R_2$ are selected from the group consisting of hydrogen and a lower alkyl radical having from 1 to 6 carbon atoms.

2. The 2,2,4-trimethyltetrahydrofuran-4-methyl carbamate.

3. The 2,2-dimethyl-4-ethyltetrahydrofuran-4-methyl carbamate.

4. The 2,2-dimethyl-4-propyltetrahydrofuran-4-methyl carbamate.

5. The 2,2-dimethyl-4-allyltetrahydrofuran-4-methyl carbamate.

6. The 2,2-dimethyl-4-propargyltetrahydrofuran-4-methyl carbamate.

7. The 2,2-dimethyl-4-phenyltetrahydrofuran-4-methyl carbamate.

8. A process for preapring a substituted tetrahydrofuran-4-methyl carbamate of the formula:

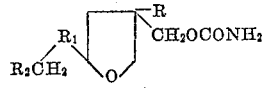

wherein R is a radical selected from the group consisting of alkyl having from one to six carbon atoms, alkenyl having from two to six carbon atoms, alkynyl radical having from two to six carbon atoms, and phenyl radical, and $R_1$ and $R_2$ are selected from the group consisting of hydrogen and a lower alkyl radical having from one to six carbon atoms, comprising reducing in the presence of lithium aluminum hydride a disubstituted diethyl malonate of the general formula:

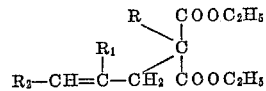

treating the diol obtained with a mineral acid whereby said diol is cyclized to a substituted tetrahydrofuran-4-methanol of the formula

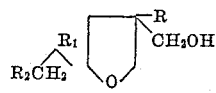

and converting the tetrahydrofuran-4-methanol to the carbamate by treatment with phosgene and a compound selected from the group consisting of ammonia and ammonium hydroxide.

References Cited in the file of this patent

UNITED STATES PATENTS

| | | |
|---|---|---|
| 2,802,838 | Deutschman et al. | Aug. 13, 1957 |
| 2,847,424 | Ward | Aug. 12, 1958 |
| 2,921,082 | Boehme | Jan. 12, 1960 |
| 2,929,823 | Garber et al. | Mar. 22, 1960 |

FOREIGN PATENTS

| | | |
|---|---|---|
| 757,294 | Great Britain | Sept. 19, 1956 |

UNITED STATES PATENT OFFICE
CERTIFICATE OF CORRECTION

Patent No. 3,073,848                January 15, 1963

Burton Kendall Wasson et al.

It is hereby certified that error appears in the above numbered patent requiring correction and that the said Letters Patent should read as corrected below.

Column 3, lines 55 to 60, and column 4, lines 8 to 11, and lines 25 to 28, formulas VIII, each occurrence, should appear as shown below instead of as in the patent:

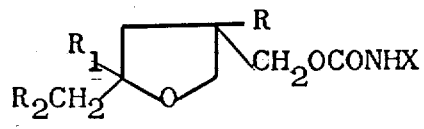

column 3, lines 61 to 65, and column 4, lines 16 to 20, formulas IX, each occurrence, should appear as shown below instead of as in the patent:

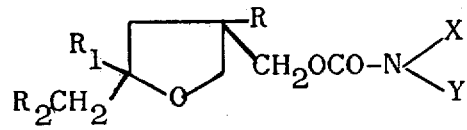

column 4, lines 3 to 7, and lines 25 to 28, formula VII, each occurrence, should appear as shown below instead of as in the patent:

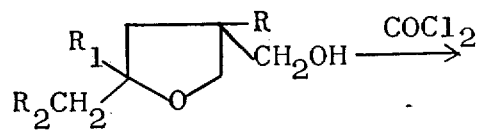

lines 11 to 16, formula X, should appear as shown below instead of as in the patent:

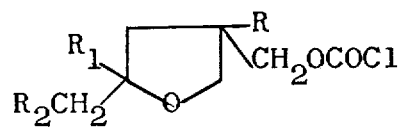

lines 25 to 28, formula VII, should appear as shown below instead of as in the patent:

3,073,848

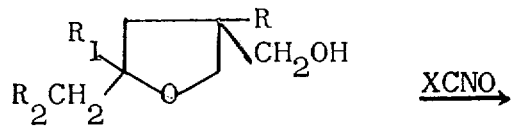

column 4, line 37 to 40 and column 10, lines 29 to 33 and lines 55 to 59, the formulas, each occurrence, should appear as shown below instead of as in the patent:

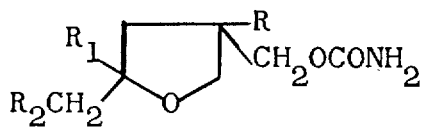

column 10, line 53, for "preapring" read -- preparing --; column 11, lines 3 to 6, the formula should appear as shown below instead of as in the patent:

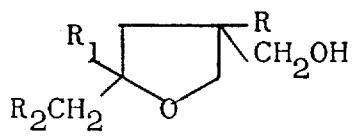

Signed and sealed this 10th day of September 1963.

(SEAL)
Attest:

ERNEST W. SWIDER
Attesting Officer

DAVID L. LADD
Commissioner of
Patents